(12) United States Patent
Zheng et al.

(10) Patent No.: US 10,839,362 B2
(45) Date of Patent: Nov. 17, 2020

(54) OFFLINE PIN AUTHENTICATION METHOD AND SYSTEM FOR IC CARD

(71) Applicant: CHINA UNIONPAY CO., LTD., Shanghai (CN)

(72) Inventors: Jianbin Zheng, Shanghai (CN); Yu Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 645 days.

(21) Appl. No.: 14/785,193

(22) PCT Filed: Apr. 22, 2014

(86) PCT No.: PCT/CN2014/075903
§ 371 (c)(1),
(2) Date: Oct. 16, 2015

(87) PCT Pub. No.: WO2014/173280
PCT Pub. Date: Oct. 30, 2014

(65) Prior Publication Data
US 2016/0071081 A1    Mar. 10, 2016

(30) Foreign Application Priority Data
Apr. 22, 2013 (CN) .......................... 2013 1 0139644

(51) Int. Cl.
*G06Q 20/20* (2012.01)
*H04L 29/06* (2006.01)
(Continued)

(52) U.S. Cl.
CPC .......... *G06Q 20/204* (2013.01); *G06Q 20/34* (2013.01); *G06Q 20/3829* (2013.01);
(Continued)

(58) Field of Classification Search
None
See application file for complete search history.

(56) References Cited

U.S. PATENT DOCUMENTS 6,327,578 B1 * 12/2001 Linehan ................. G06Q 20/02
705/65
8,095,113 B2    1/2012 Kean et al.
(Continued)

FOREIGN PATENT DOCUMENTS

CN      102377570 A     3/2012
JP      2004178338 A    6/2004
(Continued)

OTHER PUBLICATIONS

Steven J. Muroch, Saar Drimer, Ross Anderson, Mike Bond, "Chip and PIN is Broken", 2010, University of Cambridge (Year: 2010).*
(Continued)

*Primary Examiner* — Mamon Obeid
*Assistant Examiner* — Timothy Paul Sax
(74) *Attorney, Agent, or Firm* — Anova Law Group, PLLC

(57) ABSTRACT

The present invention relates to an off-line PIN authentication and an off-line PIN authentication system. The method comprises: inputting an off-line PIN1 to a POS terminal, the POS terminal generating a dynamic challenge code, and transmitting the dynamic challenge code and the off-line PIN1 to a card application; the card application verifying the first off-line PIN1 and the second off-line PIN2 are consistent with each other or not; if consistent, a digital signature being made on the first off-line PIN1 and the second off-line PIN2 to return signature data and a success status code to the POS terminal; the POS terminal verifying the signature data in case of receiving the success status code, and starting the subsequent transaction procedure if the signature data is verified successfully. According to the present invention, it (Continued)

not only can realize the verification of the IC card to the off-line PIN, but also can realize the verification of the terminal to the off-line PIN. The method is implemented simply, is practical, safe and reliable.

7 Claims, 5 Drawing Sheets

(51) Int. Cl.
*H04L 9/32* (2006.01)
*G06Q 20/34* (2012.01)
*G06Q 20/38* (2012.01)
*G06Q 20/40* (2012.01)

(52) U.S. Cl.
CPC ....... *G06Q 20/4012* (2013.01); *H04L 9/3247* (2013.01); *H04L 9/3273* (2013.01); *H04L 63/083* (2013.01); *H04L 63/0853* (2013.01); *H04L 2209/56* (2013.01)

(56) References Cited

U.S. PATENT DOCUMENTS

| | | | | |
|---|---|---|---|---|
| 8,152,074 B1* | 4/2012 | de Jong | ............. | G06Q 20/3574 235/492 |
| 2002/0111918 A1* | 8/2002 | Hoshino | ............. | G06Q 20/3572 705/65 |
| 2003/0105964 A1* | 6/2003 | Brainard | ............... | H04L 9/3297 713/178 |
| 2003/0132284 A1* | 7/2003 | Reynolds | ............. | G06Q 20/341 235/380 |
| 2006/0080550 A1* | 4/2006 | Awatsu | ................... | G06F 21/32 713/186 |
| 2008/0165951 A1* | 7/2008 | Somers | ................ | G06Q 20/401 380/2 |
| 2012/0116846 A1* | 5/2012 | Levy | ..................... | G06Q 20/10 705/7.32 |
| 2012/0124381 A1* | 5/2012 | Kim | ...................... | H04L 9/3242 713/176 |
| 2013/0204794 A1* | 8/2013 | Sahota | ................... | G06Q 20/20 705/67 |

FOREIGN PATENT DOCUMENTS

| | | |
|---|---|---|
| KR | 2003-0047910 A | 6/2003 |
| KR | 10-2010-0043799 A | 4/2010 |
| WO | WO 2012/106757 A1 | 8/2012 |

OTHER PUBLICATIONS

Korean Office Action for corresponding KR application No. 10-20150-70322359, dated Oct. 7, 2016, (English translation, 7 pages; Korean 8 pages).

Japanese Office Action for corresponding JP Application No. 2016-508002m, mailing date Unknown; no translation available.

Extended Search Report for corresponding EP Application No. 14787517.3, dated Nov. 15, 2016, 5 pages.

Steven J. Murdoch et al., "Chip and Pin is Broken," Security and Privacy (SP), 2010 IEEE Symposium On, Piscataway, NJ, May 16, 2010, pp. 433-446.

Joeri De Ruiter et al., "Formal Analysis of the EMV Protocol Suite," Mar. 3, 2011, Theory of Security and Aplicaiton, Springer Berlin Heidelberg, Berlin, pp. 113-129.

International Search Report corresponding to International Application No. PCT/CN2014/075903 dated Jul. 22, 2014.

\* cited by examiner

OFFLINE PIN AUTHENTICATION METHOD AND SYSTEM FOR IC CARD

RELATED APPLICATIONS

This application is a 35 U.S.C. § 371 national phase application of PCT Application PCT/CN2014/075903 filed Apr. 22, 2014 which claims priority to Chinese Application No. 201310139644.4 filed Apr. 22, 2013. The entire content of each is incorporated herein by reference in its entirety.

TECHNICAL FIELD

The present invention relates to an information security technology, more specifically, to a verification method and system for improving the security of the IC card off-line transaction.

BACKGROUND

Currently, in the IC card off-line PIN verification process, after a PIN is input to a terminal, if the PIN is correct, the terminal returns a successful status code "9000", that is, the terminal determines whether the identity validity of the cardholder of the IC card is authenticated only based on whether the returned status code is "9000" or not. In the whole process of authentication, the terminal can only be passively informed, but cannot perform verification actively, so that the whole process of authentication is vulnerable to man-in-middle attacks.

Hereinafter, such IC card off-line PIN verification process in prior art is described.

FIG. 1 is a flowchart showing the off-line PIN authentication in prior art. As shown in FIG. 1, the current procedure of the off-line PIN authentication includes the following steps:

step 1: a cardholder entering a PIN on a POS terminal;
step 2: the POS terminal organizing an authentication PIN command and transmitting it to an IC card payment application for verification;
step 3: after the IC card is verified, returning a verification status code to the POS terminal to inform the POS terminal whether the verification is successful or not, wherein, if the verification status code is 9000, then the verification is successful, and if the verification status code is not 9000, then it means that the validation makes an error;
step 4: the POS terminal determining the identity validity of the cardholder by determining whether the returned verification status code is 9000 or not, and executing the subsequent transaction procedures.

It can be seen from the above procedures that, the POS terminal determines the identity validity of the cardholder only based on whether the status code is 9000 or not, and it is a plaintext. This is easy to lead to a man-in-middle attack of the returned status code by the status code indicating "error" being modified to 9000, which causes a false impression that the POS terminal considers the cardholder currently inputting the PIN is valid.

The typical procedure for the attack on the off-line cardholder authentication process is as follows, where the contact type electronic cash is described as an example. FIG. 2 is a flowchart showing the contact type electronic cash authentication in prior art. As shown in FIG. 2, firstly the terminal initiates a card authentication to the contact type PBOC electronic cash and acquires the number of PIN attempt, and then, an arbitrary PIN code is input at the terminal, a status code "9000" is returned to the terminal through a man-in-middle performing hostile attacks, the terminal determines that the verification is successful according to the status code "9000" and agrees to execute the subsequent transaction procedures.

It can be seen from the above description of FIG. 2 and the description of PBOC borrowing standard, no matter what value of the PIN code is input at the terminal, the successfully verified code "9000" can be returned through a man-in-middle performing hostile attacks and the subsequent off-line deduction transaction can be completed continuously, which will cause property damage to the cardholder.

After further expansion, it is known that as long as the subsequent on-line operations takes off-line PIN authentication of the smart card as a prerequisite, there will exist the same security risks, such as the client landing operation taking the smart card off-line PIN as the elements. Under this condition, when the criminals pick up an client with a payment function, once worming the client's confidence by the way of the man-in-middle attack, then all the functions of the client will be exposed to the criminals, maybe it will be able to modify the user's information through the verification code and even reset the payment password.

SUMMARY

In view of the above problems, the present invention aims to provide an IC card off-line PIN verification method and system, which can effectively prevent attacks on the off-line PIN authentication procedure and which is safe and reliable.

An IC card off-line PIN verification method of the present invention, characterized as including the following steps:
step a: a POS terminal obtaining a first off-line PIN1, and the POS terminal generating a dynamic challenge code, an XOR operation being carried out on the dynamic challenge code and the first off-line PIN1 to derive a first XOR value which is transmitted to a card application of IC card together with the dynamic challenge code, wherein the first off-line PIN1 is a password input to the POS terminal by a cardholder;
step b: the card application carrying out the XOR operation on the dynamic challenge code and a second off-line PIN2 to derive a second XOR value, and verifying whether the first XOR value and the second XOR value are consistent with each other or not, wherein the second off-line PIN2 is a real password of the IC card stored in the IC card in advance;
step c: in case that the determination is consistent at step b, the card application making a signature on the second XOR value, and returning the signature data of the second XOR value and a success status code to the POS terminal; in case that the determination is inconsistent at step b, an error status code being returned to the POS terminal; and
step d: the POS terminal verifying the signature data of the second XOR value in case of receiving the success status code, and starting the subsequent transaction procedure if the signature data of the second XOR value is verified successfully and executing an abnormal processing if the signature data of the second XOR value is verified unsuccessfully; on the other hand, the POS terminal executing the abnormal processing in case of receiving the error status code.

Preferably, at the step a, the POS terminal generates a random number as a dynamic challenge code, and produces the first XOR value.

Preferably, at the step c, the data signature is made on the second XOR value using a private key to generate the signature data of the second XOR value, and at the step d, the POS terminal verifies the signature data of the second XOR value in case of receiving the success status code in the manner as follows: performing a signature verification on the signature data of the second XOR value using a public key; and comparing the first XOR value and the second XOR value to determine whether the two values are consistent with each other or not.

The IC card off-line verification method according to the present invention, by using a digital signature technology and the dynamic challenge code, not only can realize the verification of the IC card to the off-line PIN, but also can realize the verification of the terminal to the off-line PIN. In particular, off-line PIN in the form of plaintext does not appear during the interaction between the card and the terminal, thus further improving the security.

An IC card off-line PIN verification method of another aspect of the present invention, characterized as including the following steps:

step a: a POS terminal obtaining a first off-line PIN1, and the POS terminal generating a dynamic challenge code, the dynamic challenge code and the off-line PIN1 being transmitted to the card application of IC card, wherein the first off-line PIN1 is a password input to the POS terminal by a cardholder; step b: the card application verifying whether the first off-line PIN1 and a second off-line PIN2 are consistent with each other or not, wherein the second off-line PIN2 is a real password of the IC card stored in the IC card in advance; step c: in case that the determination is "consistent" at step b, the card application performing a specified calculation on the first off-line PIN1 and the second off-line PIN2 to derive a first signature data, and the first signature data and a success status code being returned to the POS terminal; in case that the determination is "inconsistent" at step b, an error status code being returned to the POS terminal; and step d: the POS terminal verifying the first signature data in case of receiving the success status code, and starting the subsequent transaction procedure if the first signature data is verified successfully and executing an abnormal processing if the first signature data is verified unsuccessfully; on the other hand, the POS terminal executing the abnormal processing in case of receiving the error status code.

Preferably, at the step a, the POS terminal generates a random number as a dynamic challenge code.

Preferably, at the step a, the POS terminal composes the first off-line PIN1 and the dynamic challenge code into a verification instruction to transmit them together to the card application.

Preferably, at the step a, the POS terminal transmits the dynamic challenge code to the card application first, and then transmits the first off-line PIN1 to the card application.

Preferably, at the step a, the POS terminal generates the dynamic challenge code which is stored in the POS terminal together with the first off-line PIN1.

Preferably, at the step c, the card application performs the following calculation on the dynamic challenge code and the second off-line PIN to derive the first signature data: calculating a first XOR value of the dynamic challenge code and the second off-line PIN2; making a data signature on the first XOR value using a private key to generate the first signature data, and at the step d, the POS terminal verifies the first signature data in case of receiving the success status code in the manner as follows: calculating a second XOR value of the dynamic challenge code and the first off-line PIN1; making the data signature on the second XOR value using a public key to generate the second signature data; and comparing the first signature data and the second signature data to determine whether the two data are consistent with each other or not.

An IC card off-line PIN verification system of the present invention, characterized as including a POS terminal and a card application module of IC card, wherein the POS terminal comprises: a password obtaining module for obtaining a password input by a cardholder as a first off-line PIN1; a dynamic challenge code generating module for generating a dynamic challenge code randomly; a first storing module for storing the first off-line PIN1 and the dynamic challenge code; a first receiving/transmitting module for executing data transmitting and receiving between the POS terminal and the card application module of the IC card; and a dynamic challenge code verification module for verifying a first signature data in case of receiving the following success status code from the first receiving/transmitting module, and starting the subsequent transaction procedure if the first signature data is verified successfully and executing an abnormal processing if the first signature data is verified unsuccessfully; and a first receiving/transmitting module for executing data transmitting and receiving between the POS terminal and the card application module of the IC card.

The card application module of IC card comprises: a password verification module for verifying whether the first off-line PIN1 received from the POS terminal and a second off-line PIN2 stored in the IC card in advance are consistent with each other or not, and outputting an error status code in case of verifying that they are inconsistent, wherein the second off-line PIN2 is a real password of the IC card; a digital signature module for performing a specified calculation on the first off-line PIN1 and the second off-line PIN2 to derive a first signature data in case of the password verification module verifying that the first off-line PIN1 and the second off-line PIN2 are consistent with each other; and a second receiving/transmitting module for executing data transmitting and receiving between the POS terminal and the card application module of the IC card, returning the first signature data and a success status code to the first receiving/transmitting module in case that the verifying of the password verification module is successful and transmitting an error status code to the first receiving/transmitting module in case that the verifying of the password verification module is unsuccessful.

Preferably, the first receiving/transmitting module transmits the dynamic challenge code generated by the dynamic challenge code generating module and stored in the first storing module and the first off-line PIN1 together to the second receiving/transmitting module.

Preferably, the first receiving/transmitting module transmits the dynamic challenge code generated by the dynamic challenge code generating module and stored in the first storing module to the second receiving/transmitting module first, and then transmits the first off-line PIN1 to the second receiving/transmitting module.

Preferably, the digital signature module is used for calculating a first XOR value of the dynamic challenge code and the second off-line PIN2, making a data signature on the first XOR value using a private key to generate the first signature data, and the dynamic challenge code verification module is used for calculating a second XOR value of the dynamic challenge code and the first off-line PIN1 and making the data signature on the second XOR value using a public key to generate the second signature data, and comparing the first signature data and the second signature data to determine whether the two data are consistent with each other or not.

The IC card off-line verification method and verification system according to the present invention, by using the digital signature technology and the dynamic challenge code, not only can realize the verification of the IC card to the off-line PIN, but also can realize the verification of the terminal to the off-line PIN. The method is implemented simply, is practical, safe and reliable, can effectively prevent attacks on the off-line PIN authentication procedure and can ensure the security during IC card payment process.

DETAILED DESCRIPTION

The following are some of multiple embodiments of the present invention to provide a general understanding of the present invention. It is not intended to confirm the key or decisive elements of the present invention or to define the scope to be protected.

Figure 1:
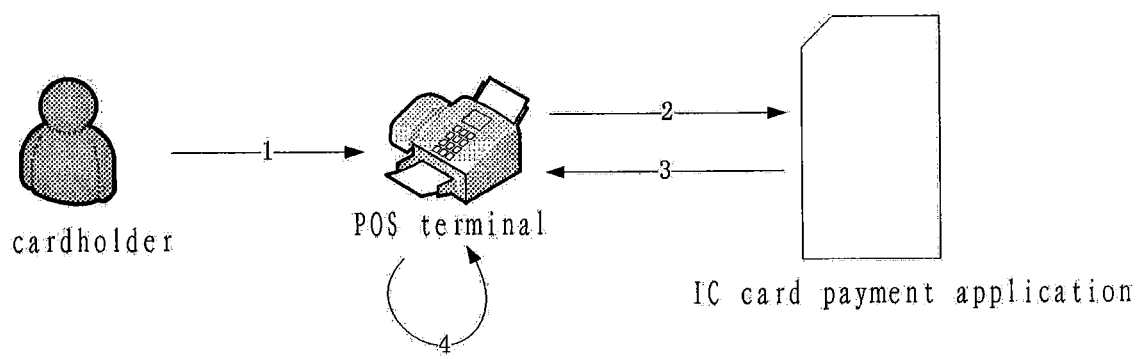
FIG. 1 is a flowchart showing an off-line PIN authentication in prior art.
Figure 2:
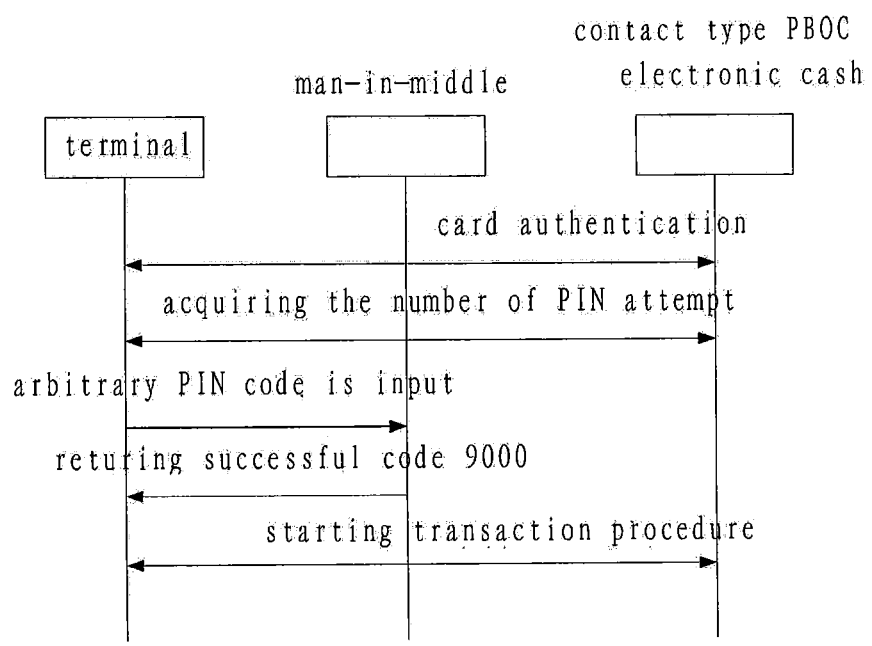
FIG. 2 is a flowchart showing a contact type electronic cash authentication in prior art.
Figure 3:
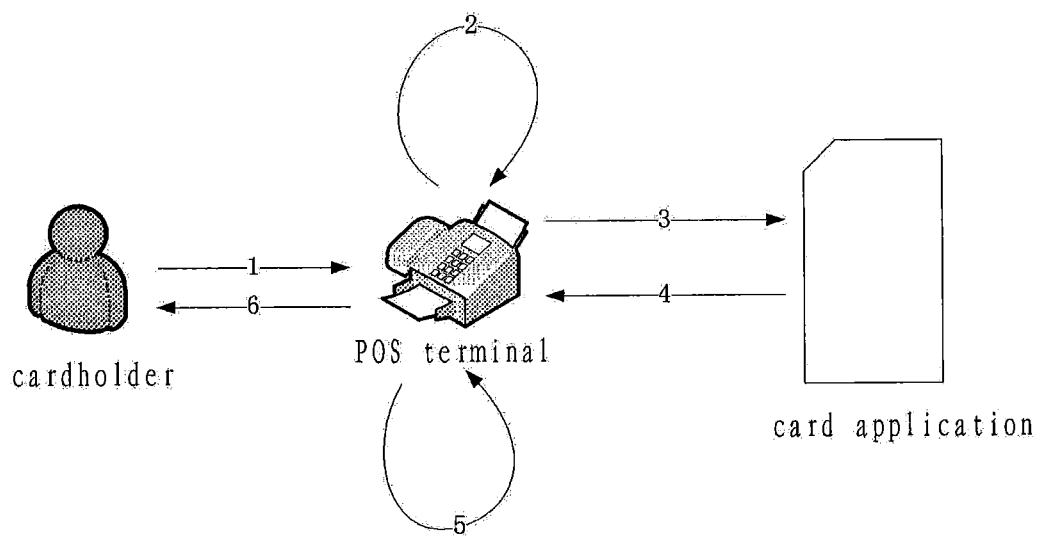
FIG. 3 is a flowchart showing an off-line PIN authentication of the present invention.

FIG. 3 is a flowchart showing an off-line PIN authentication of the present invention. As illustrated in FIG. 3, the off-line PIN authentication method of the present invention includes the following steps:

step 1: a cardholder inputting an off-line PIN1 to a POS terminal.

Step 2: the POS terminal generating a random number Rnd as a dynamic challenge code, and storing the dynamic challenge code and the off-line PIN1 together into an encrypted chip in the POS, Here, the random number Rnd is generated by the hardware of the terminal in the POS, the random number may be of arbitrary digits, for example, a random number of 8-bit bytes.

Step 3: the POS terminal attaching the dynamic challenge code Rnd to the off-line PIN1 and composing them into a verification instruction to be transmitted to a card application. The "card application" herein refers specifically to the application loaded on and running in the IC card chip.

Step 4: the card application verifies the off-line PIN1 and a real password PIN2 of the IC card stored in the IC card in advance are consistent with each other or not. An error status code will be returned to the POS terminal directly if inconsistent, and the following steps would be performed if consistent:
(1) calculating a XOR value Tdata1 of the random number Rnd and the off-line PIN2, i.e., Tdata1=Rnd XOR PIN2;
(2) making a digital signature using a private key SkTdata1 to derive digital signature data Sig1; and
(3) returning Sig1+9000 (a success status code) to the POS terminal.

Step 5: the POS terminal determining the returned status code is the success status code or the error status code after receiving the response from the card application, then executing the corresponding abnormal processing logic if it is the error status code and executing the following verification actions if it is the success status code 9000:
(1) calculating a XOR value Tdata2 of the random number Rnd and the off-line PIN1, i.e., Tdata2=Rnd XOR PIN1; and
(2) verifying the digital signature Sig1 using a public key Pk stored in the POS terminal and comparing whether Tdata2 and Tdata1 are consistent with each other or not. If the two are consistent, it means that the card application executes actually the PIN1 verification instruction transmitted by the POS terminal; if the two are inconsistent, it means that it is subjected to a man-in-middle attack.

On the other hand, at the above step 3, the POS terminal attaches the dynamic challenge code Rnd to the off-line PIN1 and transmits them together to the card application, and certainly also may transmit the dynamic challenge code Rnd and the off-line PIN1 in tandem to the card application, in this way, the POS terminal should transmit the dynamic challenge code to the card application first, and then transmit the off-line PIN1 to the card application.

In the above steps 4 and 5, a pair of private key Sk and public key Pk is employed for the verification, that is, such non-symmetric key system can be used to carry out authentication in the present invention, for example, specifically the RSA algorithm and the like may be employed. The main advantage of the non-symmetric key system is better in security and expandability. In addition to this, in the above steps 4 and 5 of the present invention of, of course a symmetric key system can also be used for the authentication.

The IC card off-line authentication method according to the present invention, by using the digital signature technology and the dynamic challenge code, not only can realize the verification of the IC card to the off-line PIN, but also can realize the verification of the terminal to the off-line PIN. The method is implemented simply, is practical, safe and reliable, can effectively prevent attacks on the off-line PIN authentication procedure and can ensure the security during IC card payment process.

Next, an authentication process of applying an off-line authentication method of the present invention to a contact type PBOC electronic cash will be described.

Figure 4:
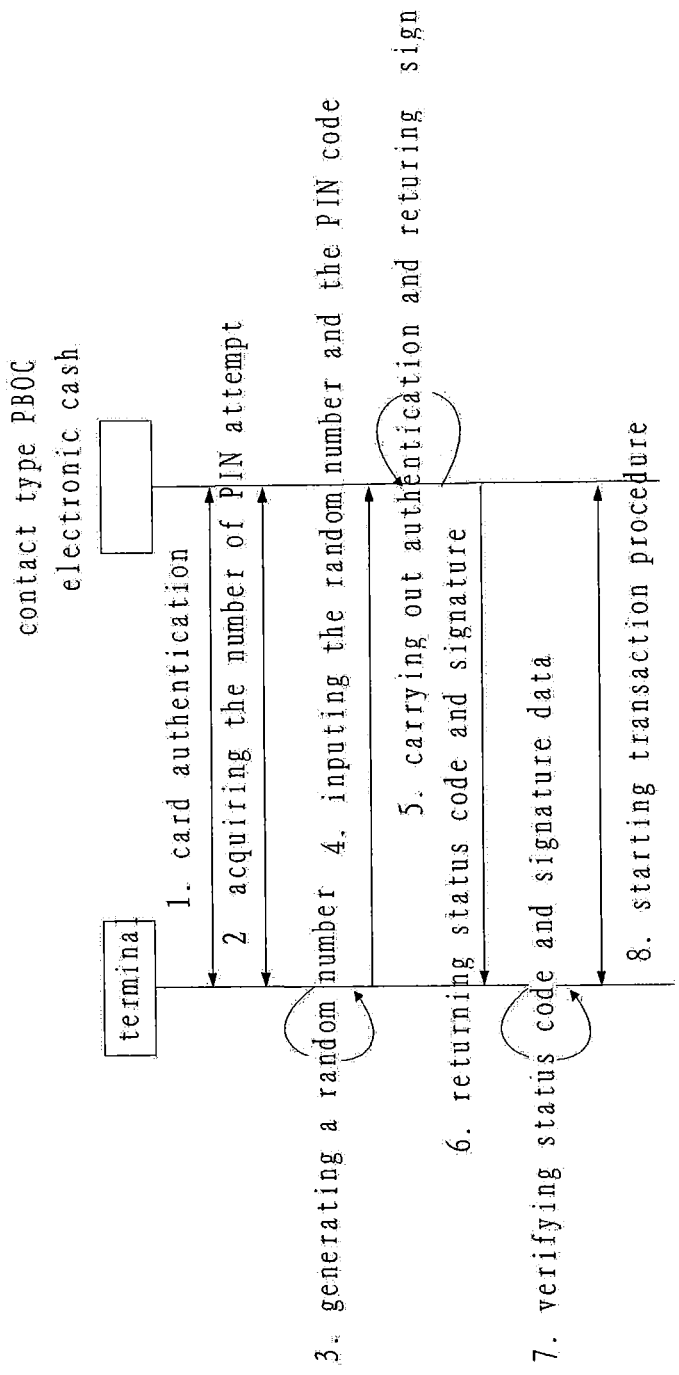
FIG. 4 is a flowchart of applying an off-line PIN authentication method of the present invention to a contact type PBOC electronic cash.

FIG. 4 is a flowchart of applying an off-line PIN authentication method of the present invention to a contact type PBOC electronic cash.

As illustrated in FIG. 4, the authentication process includes the following steps:

step 1: initiating a card authentication to the contact type PBOC electronic cash from the terminal (not belonging to the scope of the present invention).

Step 2: the terminal acquiring the number of PIN attempt (not belonging to the scope of the present invention).

Step 3: the terminal generating a random number, step 4: the terminal transmitting the random number and the PIN code to the contact type PBOC electronic cash.

Step 5: the contact type PBOC electronic cash carrying out the authentication on the input PIN code, and making the data signature on the PIN code and the random number.

Step 6: the contact type PBOC electronic cash returning a status code and a digital signature to the terminal, in which returning a success status code and the digital signature in case that the PIN code is authenticated successfully, and only returning an error status code in case that the PIN code is authenticated unsuccessfully.

Step 7: the terminal verifying the status code and the digital signature, and verifying the digital signature in case of obtaining the success status code, and executing an abnormal processing in case of obtaining the error status code; and Step 8: in case that the terminal verifies both the status code and the digital signature successfully, starting the subsequent transaction procedure.

Through applying the above off-line PIN authentication method of the present invention to the contact type PBOC electronic cash, it can also effectively prevent attacks on the off-line PIN authentication procedure and ensure the security of the contact type PBOC electronic cash.

Next, the off-line PIN authentication system of the present invention will be described simply.

Next, another implementation of the present invention will be described. The difference between this implementation and the above implementation is that, after the POS terminal generates a dynamic challenge code, the POS terminal carries out an XOR operation on the dynamic challenge code and the first off-line PIN1 to derive a first XOR value, and the card application carries out the XOR operation on the dynamic challenge code and the second off-line PIN2 to derive a second XOR value when performing verification, then compares whether the first XOR value and the second XOR value are consistent with each other or not to determine whether the card PIN verification is successful or not, and a signature is made on the second XOR value using a private key for returning to the POS terminal, and the POS terminal verifies the signature data of the second XOR value using a public key, and then compares whether the first XOR value and the second XOR value are consistent with each other or not to determine whether the cardholder PIN verification is successful or not.

The IC card off-line PIN verification method of the implementation specifically includes the following steps:

step a: a POS terminal obtaining a first off-line PIN1, and the POS terminal generating a dynamic challenge code, an XOR operation being carried out on the dynamic challenge code and the first off-line PIN1 to derive a first XOR value which is transmitted to the card application of IC card together with the dynamic challenge code, wherein the first off-line PIN1 is a password input to the POS terminal by a cardholder;

step b: the card application carrying out the XOR operation on the dynamic challenge code and a second off-line PIN2 to derive a second XOR value, and verifying whether the first XOR value and the second XOR value are consistent with each other or not, wherein the second off-line PIN2 is a real password of the IC card stored in the IC card in advance;

step c: in case that the determination is "consistent" at step b, the card application making a signature on the second XOR value, and the signature data of the second XOR value and a success status code being returned to the POS terminal; in case that the determination is "inconsistent" at step b, an error status code being returned to the POS terminal; and step d: the POS terminal verifying the signature data of the second XOR value in case of receiving the success status code, and starting the subsequent transaction procedure if the signature data of the second XOR value is verified successfully and executing an abnormal processing if the signature data of the second XOR value is verified unsuccessfully; on the other hand, the POS terminal executing the abnormal processing in case of receiving the error status code.

At the step a, the POS terminal generates a random number as a dynamic challenge code, and produces the first XOR value.

At the step c, the data signature is made on the second XOR value using a private key to generate the signature data of the second XOR value, and at the step d, the POS terminal verifies the signature data of the second XOR value in case of receiving the success status code in the manner as follows: performing a signature verification on the signature data of the second XOR value using a public key; and comparing the first XOR value and the second XOR value to determine whether the two values are consistent with each other or not.

The IC card off-line verification method according to the implementation, by using a digital signature technology and the dynamic challenge code, not only can realize the verification of the IC card to the off-line PIN, but also can realize the verification of the terminal to the off-line PIN. In particular, off-line PIN in form of plaintext does not appear during the interaction between the card and the terminal, thus further improving the security.

Figure 5:
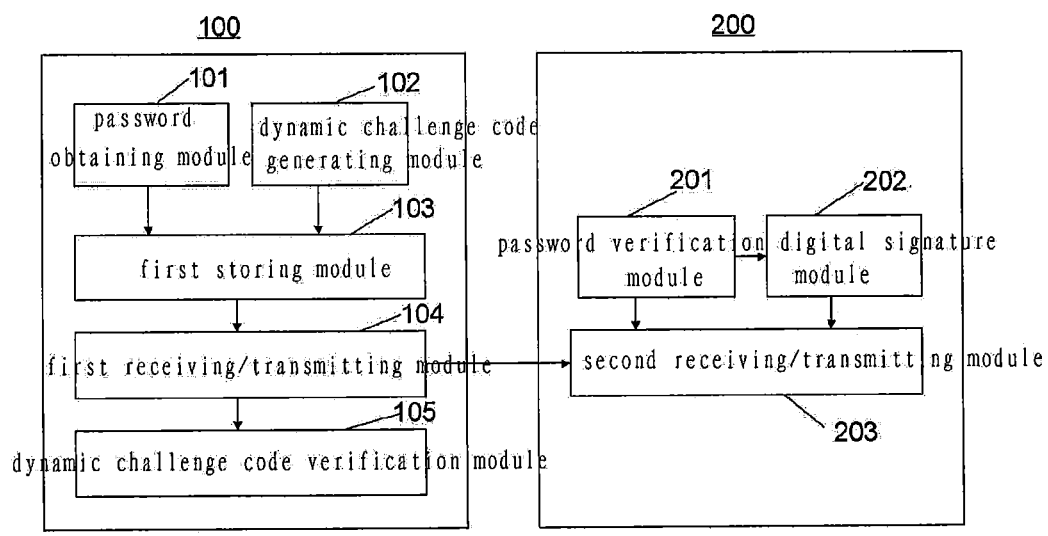
FIG. 5 is a structural block diagram showing an off-line PIN authentication system of the present invention.

FIG. 5 is a structural block diagram showing an off-line PIN authentication system of the present invention. As illustrated in FIG. 5, an IC card off-line PIN verification system of the present invention includes a POS terminal 100 and a card application module 200 of IC card.

The POS terminal 100 comprises a password obtaining module 101, a dynamic challenge code generating module 102, a first storing module 103, a first receiving/transmitting module 104, and a dynamic challenge code verification module 105. The card application module 200 of IC card comprises: a password verification module 201, a digital signature module 202, and a second receiving/transmitting module 203.

The password obtaining module 101 is used for obtaining a password input by a cardholder as a first off-line PIN1.

The dynamic challenge code generating module 102 is used for generating a dynamic challenge code randomly, the dynamic challenge code randomly generated may be data of arbitrary bytes, for example, a random number of 8-bit bytes.

The first storing module 103 is used for storing the first off-line PIN1 and the dynamic challenge code.

The first receiving/transmitting module 104 is used for executing data transmitting and receiving between the POS terminal and the card application module of the IC card.

The dynamic challenge code verification module 105 is used for verifying a first signature data in case of receiving the following success status code from the first receiving/transmitting module, and starting the subsequent transaction procedure if the first signature data is verified successfully and executing an abnormal processing if the first signature data is verified unsuccessfully.

The first receiving/transmitting module 104 is used for executing data transmitting and receiving between the POS terminal and the card application module of the IC card, i.e., transmitting the dynamic challenge code and the first off-line PIN1 stored in the first storing module 103 to the following second receiving/transmitting module 203 of the card application module 200 of IC card, and correspondingly receiving data from the following second receiving/transmitting module 203 of the card application module 200 of IC card. Wherein, the first receiving/transmitting module 104 transmits the dynamic challenge code generated by the dynamic challenge code generating module 102 and stored in the first storing module 103 and the first off-line PIN1 together to the second receiving/transmitting module 203. Alternatively, the first receiving/transmitting module 104 transmits the dynamic challenge code generated by the dynamic challenge code generating module 102 and stored in the first storing module 103 to the second receiving/transmitting module 203 first, and then transmits the first off-line PIN1 to the second receiving/transmitting module 203.

On the other hand, the password verification module 201 is used for verifying whether the first off-line PIN1 received from the POS terminal and a second off-line PIN2 (the second off-line PIN2 is a real password of the IC card) stored in the IC card in advance are consistent with each other or not, and outputting an error status code in case of verifying that they are inconsistent, and outputting a success status code 9000 in case that verification is successful.

The digital signature module 202 is used for performing a specified calculation on the first off-line PIN1 and the second off-line PIN2 to derive a first signature data in case of the password verification module 201 verifying that the first off-line PIN1 and the second off-line PIN2 are consistent with each other.

The second receiving/transmitting module 203 is used for executing data transmitting and receiving between the POS terminal 100 and the card application module 200 of the IC card, returning the first signature data and a success status code to the first receiving/transmitting module 105 in case that the verifying of the password verification module 201 is successful and transmitting an error status code to the first receiving/transmitting module 104 in case that the verifying of the password verification module 201 is unsuccessful.

As a special implementation, the digital signature module 202 is used for calculating a first XOR value of the dynamic challenge code and the second off-line PIN2, making a data signature on the first XOR value using a private key to generate the first signature data. Correspondingly, the dynamic challenge code verification module 105 calculates a second XOR value of the dynamic challenge code and the first off-line PIN1 and makes the data signature on the second XOR value using a public key to generate the second signature data, and compares the first signature data and the second signature data to determine whether the two data are consistent with each other or not, if the comparison result is the two are consistent, it means that the card application executes actually the PIN1 verification instruction transmitted by the POS terminal; if the comparison result is the two are inconsistent, it means that it is subjected to a man-in-middle attack.

The IC card off-line authentication system according to the present invention, by using the digital signature technology and the dynamic challenge code, not only can realize the verification of the IC card to the off-line PIN, but also can realize the verification of the terminal to the off-line PIN. The method is implemented simply, is practical, safe and reliable, can effectively prevent attacks on the off-line PIN authentication procedure and can ensure the security during IC card payment process.

The off-line PIN authentication and the off-line PIN authentication system of the present invention have the following characteristics: not only realizing the authentication of the card to the cardholder, but also realizing the authentication of the terminal to the cardholder; further enhanced security of the transaction; the terminal is no longer informed whether the cardholder authentication is successful or not only through the returned status code, but further verifies whether the card executes actually the certification of the offline PIN or not through the present creativity on the basis of the above; be capable of further improving the security of acceptance environment.

The above examples mainly illustrate an off-line PIN authentication method and an off-line PIN authentication system of the present invention. Although it is only a description of some of specific implementations of the present invention, but those skilled in the art should understand that the present invention may be implemented in many other forms without departing from its idea and scope. Therefore, the examples and implementations shown are considered to be exemplary and non-restrictive, and various modifications and replacements may be covered by the present invention without departing from the spirit and scope of the present invention as defined by the attached claims.

The invention claimed is:

1. An integrated circuit (IC) card off-line personal identification number (PIN) verification method, comprising:
    obtaining, by a point-of-sale (POS) terminal, a first off-line PIN1, wherein the first off-line PIN1 is a password input to the POS terminal;
    generating, by the POS terminal, a dynamic challenge code;
    transmitting, by the POS terminal and at the same time, both the dynamic challenge code and the first off-line PIN1 to a card application of an IC card;
    verifying, by the card application, whether the first off-line PIN1 and a second offline PIN2 are consistent with each other, wherein the second off-line PIN2 is a password stored in the IC card;
    in response to verifying that the first off-line PIN1 and the second off-line PIN2 are consistent with each other, performing, by the card application, a specified calculation using the dynamic challenge code and the second off-line PIN2, resulting in a first signature data, and transmitting both the first signature data and a success status code to the POS terminal;
    performing, by the POS terminal, a verification operation of the first signature data using the first off-line PIN1 and the dynamic challenge code; and
    starting, by the POS terminal, a transaction procedure responsive to a successful verification of the first signature data by the POS terminal,
    wherein performing, by the card application, the specific calculation using the dynamic challenge code and the second off-line PIN2 to derive the first signature data comprises:
    calculating a first XOR value of the dynamic challenge code and the second off-line PIN2; and
    making a data signature on the first XOR value using a private key to generate the first signature data, and
    wherein performing, by the POS terminal, the verification operation of the first signature data using the dynamic challenge code and the first off-line PIN1 comprises:
    calculating a second XOR value of the dynamic challenge code and the first off-line PIN1;
    making a signature verification on the first signature data using a public key; and
    comparing the first XOR value and the second XOR value to determine whether the first and second XOR values are consistent with each other and, responsive to that the first and second XOR values are not consistent with each other, to determine that the POS terminal is subjected to a man-in-middle attack.

2. The IC card off-line PIN verification method of claim 1, wherein generating the dynamic challenge code comprises generating a random number as the dynamic challenge code.

3. The IC card off-line PIN verification method of claim 2, wherein transmitting both the first off-line PIN1 and the dynamic challenge code to the card application comprises composing, by the POS terminal, a verification instruction comprising both the first off-line PIN1 and the dynamic challenge code.

4. The IC card off-line PIN verification method of claim 2, wherein generating, by the POS terminal, the dynamic challenge code comprises storing the dynamic challenge code in the POS terminal together with the first off-line PIN1.

5. An integrated circuit (IC) card off-line personal identification number (PIN) verification system comprising a POS terminal and an IC card,
wherein the POS terminal is configured to perform operations comprising:
obtaining a password input from a cardholder as a first off-line PIN1;
generating a random number as a dynamic challenge code;
storing the first off-line PIN1 and the dynamic challenge code;
transmitting both the first off-line PIN1 and the dynamic challenge code to a card application of the IC card;
receiving a first signature data from the card application of the IC card; verifying the first signature data;
performing a verification operation on the first signature data using the first off-line PIN1 and the dynamic challenge code; and
starting a transaction procedure responsive to a successful verification of the first signature data, and
wherein the card application of the IC card is configured to perform operations comprising:
verifying whether the first off-line PIN1 received from the POS terminal and a second off-line PIN2 stored in the IC card in advance are consistent with each other, wherein the second off-line PIN2 is a password stored in the IC card;
responsive to verifying that the first off-line PIN1 and the second off-line PIN2 are consistent with each other, performing a specified calculation using the dynamic challenge code and the second off-line PIN2 to derive the first signature data; and transmitting the first signature data to the POS terminal,
responsive to verifying that the first off-line PIN1 and the second off-line PIN2 are not consistent with each other, transmitting only an error status code to the POS terminal without any signature data such that the first signature data representing the dynamic challenge code and the second off-line PIN2 is not available for the POS terminal,
wherein performing the specified calculation on the first off-line PIN1 and the second off-line PIN2 to derive the first signature data comprises:
calculating a first XOR value of the dynamic challenge code and the second off-line PIN2, and
making a data signature on the first XOR value using a private key to generate the first signature data, and,
wherein performing the verification operation on the first signature data comprises:
calculating a second XOR value of the dynamic challenge code and the first off-line PIN1,
verifying the data signature on the first signature data using a public key, and
comparing the first XOR value and the second XOR value to determine whether the first and second XOR values are consistent with each other and, responsive to that the first and second XOR values are not consistent with each other, to determine that the POS terminal is subjected to a man-in-middle attack.

6. The IC card off-line PIN verification system of claim 5, wherein transmitting both the first off-line PIN1 and the dynamic challenge code to the card application module of the IC card comprises transmitting the first off-line PIN1 and the dynamic challenge code in a single instruction.

7. The IC card off-line PIN verification method of claim 1, further comprising:
in response to verifying that the first off-line PIN1 and the second off-line PIN2 are not consistent with each other, transmitting, by the card application, only an error status code to the POS terminal, without any signature data such that the first signature data representing the dynamic challenge code and the second off-line PIN2 is not available for the POS terminal.

* * * * *